United States Patent

Marano et al.

[11] Patent Number: 5,225,256
[45] Date of Patent: Jul. 6, 1993

[54] NON-METALLIC BAG OR LINER FOR HAZARDOUS CHEMICAL CONTAINMENT

[75] Inventors: Gerald A. Marano; Charles E. Gibbons, both of Mobile, Ala.; Richard J. Nadaskay, Camden, Ark.; James M. Kittrell, Mobile, Ala.; Dawson G. Wilkerson, Mobile, Ala.; Allan A. Whillock, Mobile, Ala.

[73] Assignee: International Paper Company, Purchase, N.Y.

[21] Appl. No.: 779,549

[22] Filed: Oct. 18, 1991

Related U.S. Application Data

[63] Continuation-in-part of Ser. No. 504,200, Apr. 4, 1990, abandoned.

[51] Int. Cl.$^5$ .............................. B29D 22/00
[52] U.S. Cl. ..................... 428/34.2; 428/35.2; 428/347; 428/349; 428/520; 428/907
[58] Field of Search ............ 428/34.2, 35.2, 347, 428/349, 520, 907

[56] References Cited

U.S. PATENT DOCUMENTS

| | | | |
|---|---|---|---|
| Re. 33,376 | 10/1990 | Gibbons et al. | 428/34.2 |
| 2,615,614 | 10/1952 | Linda | 428/907 |
| 3,712,848 | 1/1973 | Case, Jr. et al. | 428/549 |
| 4,265,949 | 5/1981 | Kugimiya | 428/35 |
| 4,513,036 | 4/1985 | Thompson et al. | 428/35 |
| 4,615,926 | 10/1986 | Hsu et al. | 428/35 |
| 4,698,246 | 10/1987 | Gibbons et al. | 428/35 |
| 4,701,360 | 10/1987 | Gibbons et al. | 428/511 |
| 4,704,314 | 11/1987 | Hsu et al. | 428/347 |
| 4,802,943 | 2/1989 | Gibbons et al. | 156/244.33 |
| 4,806,399 | 2/1989 | Gibbons et al. | 428/349 |
| 4,859,513 | 8/1989 | Gibbons et al. | 428/34.2 |
| 4,861,526 | 8/1989 | Gibbons et al. | 264/22 |
| 4,880,701 | 11/1989 | Gibbons et al. | 428/34.2 |
| 4,888,222 | 12/1989 | Gibbons et al. | 428/34.2 |
| 4,921,733 | 5/1990 | Gibbons et al. | 428/34.2 |
| 4,929,476 | 5/1990 | Gibbons et al. | 428/34.2 |
| 4,940,612 | 7/1990 | Gibbons et al. | 428/34.2 |
| 4,948,640 | 8/1990 | Gibbons et al. | 428/34.9 |
| 4,981,739 | 1/1991 | Gibbons et al. | 428/34.2 |
| 4,983,431 | 1/1991 | Gibbons et al. | 428/34.2 |
| 4,988,546 | 1/1991 | Tanner et al. | 428/34.2 |
| 5,002,833 | 3/1991 | Kinsey, Jr. et al. | 428/475.8 |

Primary Examiner—Edith Buffalow
Attorney, Agent, or Firm—Michael J. Doyle

[57] ABSTRACT

A multilayer non-foil barrier bag or liner constructed to house hazardous chemicals such as pesticides and herbicides. The unique bags or liners maintain the efficacy of the active ingredient of the herbicide or pesticide over extended periods of time.

17 Claims, 1 Drawing Sheet

| | |
|---|---|
| PAPER LAYER(S) | -10 |
| POLYPROPYLENE | -12 |
| PAPER LAYER | -14 |
| POLYOLEFIN LAYER | -15 |
| TIE-LAYER | -16 |
| BARRIER (NON-FOIL) | -18 |
| TIE-LAYER | -20 |
| POLYOLEFIN LAYER | -22 |

(layers 15–20 bracketed as 19)

FIG. 1

| | |
|---|---|
| PAPER LAYER(S) | -10 |
| POLYPROPYLENE | -12 |
| PAPER LAYER | -14 |
| POLYOLEFIN LAYER | -15 |
| TIE-LAYER | -16 |
| BARRIER(NON-FOIL) | -18 |
| TIE-LAYER | -20 |
| POLYOLEFIN LAYER | -22 |

| | |
|---|---|
| PAPER LAYER(S) | -24 |
| POLYPROPYLENE | -26 |
| PAPER LAYER | -28 |
| BARRIER LAYER | -30 |
| TIE-LAYER | -32 |
| POLYOLEFIN LAYER | -34 |

{ -30, -32 } -31

NON-METALLIC BAG OR LINER FOR HAZARDOUS CHEMICAL CONTAINMENT

This is a continuation-in-part of copending application Ser. No. 07/504,200 filed on Apr. 4, 1990 now abandoned.

BACKGROUND OF THE INVENTION

The invention relates to a nonfoil barrier bag constructed from a unique multilayer nonfoil structure which can maintain the efficacy of active ingredients of herbicides over extended periods of time. The multilayer nonfoil structure can be formed into a microbial hermetically sealed package which provides product protection from the ingress of oxygen (or other gases), moisture, and light; while, preventing odoriferous and/or other fugitive product components (especially active ingredients) from escaping to the atmosphere. Prevention of such will keep an active ingredient's efficacy and reduce undesirable odor emanation. Packages formed from the unique multilayer nonfoil laminate structure embodying the invention can be used to preserve and contain hazardous chemicals; while, being particularly appropriate for packaging pesticides, herbicides, and various other classes of hazardous chemicals since used packages containing product residues can be totally incinerated, recycled or repulped on-site, preventing secondary hazardous waste disposal problems and/or sources of accidental contamination.

The packages constructed from the preferred laminate have been found to be extremely useful in containing herbicides and maintaining the efficacy of their active ingredients over extended periods of time during storage. Further, the packages or bags have been superior odor barriers.

Recent or proposed laws in a number of states, such as Louisiana and California, have prohibited the use of foil bags for packaging herbicides and pesticides because of the solid foil residue left when these bags are incinerated. These bags use a barrier layer of aluminum foil 0.35 mils thick, or thicker, in their laminate construction. The trend is for a number of other states to follow these states' initiatives and pass similar laws to protect the environment and limit solid waste.

Presently, there is being used a bag and/or liner for large drums or cans constructed from a foil multilayer laminate. The laminate construction which makes up the commercial bag and/or liner has the following construction: an outside layer of four plys of sheet paper having a weight of 200 lbs. per 3000 square feet (50 lbs. per 3000 sq. ft. per ply); a first layer of a low density polyethylene polymer having a weight of 6 lbs. per 3000 square feet (0.4 mil) coated on the interior side of the paper layer; a layer of aluminum foil having a weight of 14.7 lbs. per 3000 square feet (0.35 mil) placed onto the interior side of the first layer of low density polyethylene polymer; and a second inside product contact layer of low density polyethylene polymer having a weight of 20 lbs. per 3000 square feet (1.4 mil) coated onto the interior of the foil layer.

Further, there have been discussed structures which utilize unique non-commercial polyolefin materials, non-conventional in their nature, as the bases for bags or flexible packaging.

The foil multilayer laminate has served as a bag or a liner for fiber drums containing hazardous chemicals, especially herbicides, pesticides or the like.

It is an object of the present invention to produce a nonfoil or non-metallic bag or liner which replaces the conventional foil bag and is completely incinerable or readily disposable on-site to meet the legislative requirements of a growing number of states and to protect the environment.

It is a further object of the present invention to produce a nonfoil or non-metallic bag or liner which offers excellent odor, oxygen, light and moisture barrier properties with respect to the containment of hazardous or toxic products.

It is a further object of the present invention to produce a novel liner wherein commercial grade polyolefin polymers, such as linear low density polyethylene, low density polyethylene and/or combinations thereof are used as the product contact layer.

It is a further object of the present invention to produce a cost competitive nonfoil or non-metallic bag or liner which can provide at least one year of product shelf life for foods and non-foods stored at a temperature of approximately 75° F. and a relative humidity of 50%.

It is a further object of the present invention to produce a nonfoil or non-metallic bag or liner which allows inspection of the product for metal contamination without interference both in-line or off-line by existing commercially available metal detection equipment and can be subjected to microwave ovens for those unique applications which require a large capacity, nonfoil paper liner or container.

SUMMARY OF THE INVENTION

The preferred embodiment of the present invention reveals a non-metallic bag or liner which is competitively priced, completely incinerable or safely disposable, and offers excellent odor, oxygen, light, and moisture properties, is microwaveable, capable of being scanned with metal detection equipment, uses conventional commercial grade polymer materials, and is capable of providing more than one year of product shelf life at approximately 75° F. and 50% relative humidity. The non-metallic bag or liner is constructed from a laminate having multilayers of materials that are bonded together using lamination, coextrusion, or extrusion techniques such that the total structure approaches the barrier properties of metallic structures such as foil.

The non-metallic bag or liner has been found to be an excellent receptacle for herbicides such as ORDRAM®, a product of the Stauffer Chemical Company. ORDRAM® has as its active ingredient S-ethyl hexahydro-1H-azepine-1-carbothioate (MOLINATE®) and it has been found through extensive testing that the bag or liner of the present invention has functioned as a structural equal to the non-desirable glass or foil structures.

The preferred embodiment of the present invention comprises from the outer surface to the inner surface contacting the product: one or more layers of bleached or unbleached Kraft-type paper, a layer of polypropylene, a layer of bleached or unbleached Kraft-type paper, an oxygen/odor barrier material layer or layers, having, if desired, one or more tie layers, and a layer of a commercial grade conventional heat-sealable polyolefin or polyolefin blend, in contact with the product.

The bags or liners constructed of the novel structures exhibit enhanced barrier properties approaching that of foil constructions at a competitive cost.

Polymer amounts and types may be varied to maximize the performance required in relation to the cost of producing the product.

The non-metallic bag or liner is a multilayer construction on a paper substrate formed by the use of adhesives, extrusion, or coextrusion film lamination techniques or by extrusion or coextrusion resin coating processes to yield a finished structure with barrier properties paralleling foil for all practical application purposes.

BRIEF DESCRIPTION OF THE DRAWINGS

FIG. 1 is a cross-sectional elevation of the preferred embodiment of the laminate of the present invention;

FIG. 2 is a cross-sectional elevation of an alternate embodiment of the laminate of the present invention;

DETAILED DESCRIPTION OF THE INVENTION

Referring to FIG. 1, the preferred embodiment comprises a first ply of unbleached or bleached Kraft-type paper 14, having a weight of from 25 to 60 lbs. per 3000 square feet. The first ply has an outer non-product contact side and an inner product contact side. Extrusion coated or laminated to the outer non-product contact side of the first ply of Kraft-type paper 14, is a layer of polypropylene 12, having an approximate weight of from 25 to 35 lbs. per 3000 square feet, preferably 28 lbs. per 3000 square feet. Coextrusion coated or laminated onto the inner product contact side of the first ply of Kraft-type paper 14 is a three layer sandwich 19, comprised of a first tie layer 16, a barrier material layer 18, and a second tie layer 20, coextruded or otherwise formed thereon in that order. Optionally, a polyolefin layer 15 can be placed between the paper layer 14 and tie layer 16 to facilitate adhesion of the sandwich to the paper. The weight of the polyolefin layer can range from 7 to 20 lbs. per 3000 square feet. Possible olefins such as HDPE, LDPE, and LLDPE can be used.

The barrier material layer 18 can be selected from the group consisting of ethylene vinyl alcohol copolymer; polyamide polymers or copolymers; acrylonitrile polymers or copolymers; polyvinyl chloride polymers or copolymers; or multilayered combinations or blends thereof. The weight of the barrier layer 18 can range from 2 to 15 lbs. per 3000 square feet.

The first and second adhesive tie layers 16 and 20 can have a weight ranging from 3 to 10 lbs. per 3000 square feet and can be selected from the following: polyolefin based multipolymers containing one or more comonomers from the following groups: vinyl acetate; acrylic acid; methyl acrylate; ethyl acrylate; methacrylic acid; methyl methacrylate; and polyolefin based graft copolymers with polar functionality or the like including flame or corona discharge treated low density polyethylenes, linear low density polyethylenes or mixtures thereof.

Coated onto the inner side of said second tie layer 20 is a layer of a commercially available heat-sealable conventional grade polyolefin polymer or blend thereof 22. Such conventional grade polymers include low density polyethylene, linear low density polyethylene or blends thereof. The heat-sealable layer 22 can have a weight ranging from 7 to 20 lbs. per 3000 square feet, and preferably is a low density polyethylene polymer or blend thereof.

Lastly, a second set of one or more plys of bleached or unbleached Kraft-type paper 10 is adhesively or otherwise attached to the outer side of said polypropylene layer 12. Each ply can have a weight ranging from 25 to 60 lbs. per 3000 square feet.

The preferred structure embodying FIG. 1 was tested as a multiwall bag against a conventional foil multiwall bag and a glass control structure and the results are illustrated in Table 1.

TABLE 1

| I Structure | II T = 1 month | III T = 3 months | IV T = 5 months |
|---|---|---|---|
| Glass | 15.4 | 15.3 | 15.2 |
| Foil | 15.4 | 15.4 | 15.1 |
| Non-Foil | 15.6 | 15.4 | 15.0 |

Table 1 illustrates the average reactivity of the active ingredient (MOLINATE ®) in a commercial herbicide (ORDRAM ®) and showed surprisingly acceptable maintained efficacy over a five month time period. The test was conducted at a controlled elevated temperature of 120° F. and a relative humidity of 50%.

As can be seen from the test results, the novel non-foil structure embodying the invention performed as an equal to the non-environmentally desired foil structure and glass control structure, even at the elevated comparison test temperature of 120° F.

Further, there was conducted an odor comparison test, wherein herbicide filled non-foil and foil pouches in glass control structures were held in a sealed and controlled environment (T=100° F., 100%RH) and the air surrounding the packages was evaluated by a test panel after a one and one-half month period. Table 2 illustrates the panel's results.

TABLE 2

| STRUCTURE | ODOR PANEL SCORE |
|---|---|
| Air Surrounding Herbicide Stored in Glass | 3.0 |
| Air Surrounding Herbicide Filled Foil Pouch | 1.2 |
| Air Surrounding Herbicide Filled Non-Foil Pouch | 1.0 |

Listed is the average score of three judges wherein 0=no odor detectable; and 3=strong odor detectable, and all other scores therebetween range from no odor to strong odor.

Again, the results illustrate a superior performance of the novel structure embodying the present invention even at the elevated comparison test temperature.

Referring to FIG. 2, an alternate embodiment of the structure of the present invention is shown. As in the preferred embodiment described above, a first ply of bleached or unbleached Kraft-type paper 28 is provided. The first ply has an outer non-product contact side and an inner product coated side with a weight ranging from 25 to 60 lbs. per 3000 square feet. Extrusion coated or laminated to the outer side of the first ply of Kraft-type paper 28 is a layer of polypropylene 26, having an approximate weight of from 25 to 35 lbs. per 3000 square feet, preferably 28 lbs. per 3000 square feet. Coextrusion coated or laminated onto the inner product contact side of the first ply of Kraft-type paper 28 is a two layer sandwich 31 comprised of a barrier material layer 30, and a tie layer 32 coextruded or otherwise formed thereon in that order.

The barrier material layer 30 can be selected from the group consisting of ethylene vinyl alcohol copolymer; polyamide polymers or copolymers; acrylonitrile polymers or copolymers; polyvinyl chloride polymers or copolymers; or multilayered combinations or blends thereof. The weight of the barrier layer 30 can range from 2 to 15 lbs. per 3000 square feet.

The adhesive tie layer 32 can have a weight ranging from 3 to 10 lbs. per 3000 square feet and can be selected from the following: polyolefin based multipolymers containing one or more comonomers from the following groups: vinyl acetate; acrylic acid; methyl acrylate; ethyl acrylate; methacrylic acid; methyl methacrylate; and polyolefin based graft copolymers with polar functionality or the like including flame or corona discharge treated low density polyethylene, linear low density polyethylene or blends thereof.

Coated onto the inner side of the tie layer 32 is a layer of a commercial grade conventional heat-sealable polyolefin polymer or blend thereof 34. The heat-sealable layer 34 can have a weight ranging from 7 to 20 lbs. per 3000 square feet, and preferably is a low density polyethylene polymer or blend thereof.

Lastly, a second set of one or more plys of bleached or unbleached Kraft-type paper 24 is adhesively attached to the outer side of the polypropylene layer 26. Each ply can have a weight ranging from 25 to 60 lbs. per 3000 square feet.

The heat sealable polyolefin polymers contemplated for use as the commercial grade inner product contact layer of the present invention could be a linear low density polyethylene, low density polyethylene, medium density polyethylene, high density polyethylene or blends thereof.

The laminates embodying the present invention can be utilized to form packages such as bags or liners for drums to preserve chemicals such as herbicides, pesticides, or other hazardous or toxic products.

Although specific coating techniques have been described, any appropriate technique for applying the layers can be suitably employed, such as extrusion or coextrusion coating, emulsion or solution coating, adhesive extrusion, or coextrusion laminations of single or multilayered films.

The Kraft-type paper discussed as preferred for the present invention is produced from unbleached or bleached chemical pulps.

The non-metallic bag or liner prepared from a structure of the present invention is competitively priced as compared to conventional foil structures which are non-disposable or non-incinerable and environmentally unsatisfactory. In addition, the non-metallic bag or liner prepared from a structure embodying the present invention offers superior odor, moisture, oxygen, and light barrier properties, and is capable of providing more than one year of product shelf life at 75° F. and 50% relative humidity. It is also microwaveable and can be inspected with metal detection equipment.

What is claimed is:

1. A multilayered structure for constructing a package or liner for drums to hold hazardous chemical products and maintain their active ingredient efficacy comprising:
   a) a first layer of Kraft paper having an outer non-product contact side and an inner product contact side;
   b) a layer of polypropylene on said outer non-product contact side;
   c) a three layer sandwich comprising of a first tie layer, a barrier material layer and a second tie layer, said sandwich located on the inner product contact side of said first layer;
   d) a heat-sealable polyolefin polymer laid on said inner product contact side of said second tie layer; and
   e) a second layer comprising at least one ply of Kraft paper on the outer non-product contact side of said polypropylene layer.

2. A multilayered structure as claimed in claim 1, further comprising a second polyolefin polymer layer located between said first layer of paper and said three layer sandwich.

3. A multilayered structure as claimed in claim 1, wherein said barrier layer is ethylene vinyl alcohol copolymer.

4. A multilayered structure as claimed in claim 1, wherein said first and second tie layer is polyolefin based multipolymers containing one or more comonomers from the following groups: vinyl acetate; acrylic acid; methyl acrylate; ethyl acrylate; methacrylic acid; methyl methacrylate; and polyolefin based graft copolymers with polar functionality or treated low density polyethylene, linear low density polyethylene or blends thereof.

5. A multilayered structure as claimed in claim 1, wherein said heat-sealable polyolefin polymer layer is low density polyethylene, linear low density polyethylene or blends thereof.

6. A multilayered package or liner for drums to hold hazardous chemical products and maintain the efficacy of their active ingredients comprising:
   a) a first layer of Kraft paper having an outer non-product contact side and an inner product contact side;
   b) a layer of polypropylene on said outer non-product contact side;
   c) a three layer sandwich comprising of a first tie layer, a barrier material layer and a second tie layer, said sandwich located on the inner product contact side of said first layer;
   d) a heat-sealable polyolefin polymer laid on said inner product contact side of said second tie layer; and
   e) a second layer comprising at least one ply of Kraft paper on the outer non-product contact side of said polypropylene layer.

7. A non-metallic package or liner for drums as claimed in claim 6, wherein said barrier layer is ethylene vinyl alcohol copolymer.

8. A non-metallic package or liner for drums as claimed in claim 6, wherein said first and second tie layer is polyolefin based multipolymers containing one or more comonomers from the following groups: vinyl acetate; acrylic acid; methyl acrylate; ethyl acrylate; methacrylic acid; methyl methacrylate; and polyolefin based graft copolymers with polar functionality or treated low density polyethylene, or blends thereof.

9. A multilayered structure as claimed in claim 6 wherein said commercial grade conventional heat-sealable polyolefin polymer layer is low density polyethylene, linear low density polyethylene or blends thereof.

10. A multilayered structure for constructing a package or liner for drums to hold hazardous chemical products and maintain their active ingredient efficacy comprising:
   a) a first layer of Kraft paper having an outer non-product contact side and an inner product contact side;
   b) a layer of polypropylene on said outer non-product contact side;

c) a two layer structure comprised of a barrier material layer and a tie layer located on, in that order, said inner product contact side of said first layer of Kraft-type paper;
d) a heat-sealable polyolefin polymer laid on said inner product contact side of said second tie layer; and
e) a second layer comprising at least one ply of Kraft paper on the outer non-product contact side of said polypropylene layer.

11. A multilayered structure as claimed in claim 10, wherein said barrier layer is ethylene vinyl alcohol copolymer.

12. A multilayered structure as claimed in claim 10, wherein said first and second tie layer is polyolefin based multipolymers containing one or more comonomers from the following groups: vinyl acetate; acrylic acid; methyl acrylate; ethyl acrylate; methacrylic acid; methyl methacrylate; and polyolefin based graft copolymers with polar functionality or treated low density polyethylene, linear low density polyethylene or blends thereof.

13. A multilayered structure as claimed in claim 10, wherein said heat-sealable polyolefin polymer layer is low density polyethylene, linear low density polyethylene or blends thereof.

14. A multilayered package or liner for drums to hold hazardous chemical products and maintain their active ingredient efficacy comprising:

a) a first layer of Kraft paper having an outer non-product contact side and an inner product contact side;
b) a layer of polypropylene on said outer non-product contact side;
c) a two layer structure comprised of a barrier material layer and a tie layer located on, in that order, said inner product contact side of said first layer of Kraft-type paper;
d) a heat-sealable polyolefin polymer laid on said inner product contact side of said second tie layer; and
e) a second layer comprising at least one ply of Kraft paper on the outer non-product contact side of said polypropylene layer.

15. A non-metallic package or liner for drums as claimed in claim 14, wherein said barrier layer is ethylene vinyl alcohol copolymer.

16. A non-metallic package or liner for drums as claimed in claim 14, wherein said tie layer is polyolefin based multipolymers containing one or more comonomers from the following groups: vinyl acetate; acrylic acid; methyl acrylate; ethyl acrylate; methacrylic acid; methyl methacrylate; and polyolefin based graft copolymers with polar functionality or treated low density polyethylene, linear low density polyethylene or blends thereof.

17. A multilayered structure as claimed in claim 14, wherein said heat-sealable polyolefin polymer layer is low density polyethylene, linear low density polyethylene or blends thereof.

* * * * *